(12) United States Patent
Park et al.

(10) Patent No.: US 9,961,482 B2
(45) Date of Patent: May 1, 2018

(54) PORTABLE ELECTRONIC EQUIPMENT WHICH WIRELESSLY RECEIVES A SOUND SIGNAL FROM A TERMINAL AND TRANSMITS A CONTROL SIGNAL FOR CONTROLLING THE TERMINAL

(71) Applicant: LG ELECTRONICS INC., Seoul (KR)

(72) Inventors: Hyunsu Park, Seoul (KR); Hyunsun Yoo, Seoul (KR); Sooyong Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/371,412

(22) Filed: Dec. 7, 2016

(65) Prior Publication Data
US 2018/0054696 A1 Feb. 22, 2018

(30) Foreign Application Priority Data

Aug. 17, 2016 (KR) ........................ 10-2016-0104312

(51) Int. Cl.
*H04B 7/00* (2006.01)
*H04W 4/00* (2018.01)

(52) U.S. Cl.
CPC .................................... *H04W 4/008* (2013.01)

(58) Field of Classification Search
CPC ........... H04M 1/6066; H04M 1/72569; H04M 2250/12; H04M 19/04; H04M 1/6091; H04M 1/7253; H04M 1/72558; H04M 1/72563; H04M 2250/02; G06F 3/167; G06F 17/243; G06F 2203/0381; G06F 3/011; G06F 3/012; G06F 3/0219;
(Continued)

(56) References Cited

U.S. PATENT DOCUMENTS 9,325,828 B1 * 4/2016 Oh ....................... H04M 1/6066
2007/0249422 A1 * 10/2007 Podoloff .............. G06F 3/0219
463/43
(Continued)

FOREIGN PATENT DOCUMENTS

KR 10-2009-0081136 A 7/2009
KR 10-2011-0035565 A 4/2011

OTHER PUBLICATIONS

Bisdikian, "An overview of the Bluetooth wireless technology," IEEE Communications Magazine, vol. 39, No. 12, Dec. 2001, XP011091865, pp. 86-94.
(Continued)

*Primary Examiner* — Golam Sorowar
(74) *Attorney, Agent, or Firm* — Birch, Stewart, Kolasch & Birch, LLP

(57) ABSTRACT

A portable electronic equipment including a main body configured to be worn on a user's neck; a user input unit on the main body; a short-range wireless chipset loaded in the main body and configured to perform wireless communication with a host media device; and a controller configured to sense, via a sensor, whether or not the user is wearing the main body on their neck, and selectively control the short-range wireless chipset to perform the wireless communication with the host media device via a designated profile supported by the host media device and a function implemented by the host media device.

17 Claims, 6 Drawing Sheets

(a)

(b)

(58) Field of Classification Search
CPC ...... G06F 3/0231; G06F 3/033; G06F 3/0346;
G06F 3/03543; G06F 3/038; G06F 3/048;
G06F 3/0487; G06F 3/1454; H04R
1/1041; H04R 2420/07; H04R 1/10;
H04R 1/1008; H04R 1/1083; H04R
1/323; H04R 2201/025; H04R 2227/003;
H04R 2460/03; H04R 27/00; H04R
29/001; H04R 5/0335
See application file for complete search history.

(56) References Cited

U.S. PATENT DOCUMENTS

| | | |
|---|---|---|
| 2009/0222116 A1 | 9/2009 | Kang et al. |
| 2010/0191536 A1* | 7/2010 | Sampat ................. G10L 19/22 704/500 |
| 2014/0133669 A1* | 5/2014 | Klinghult ............ H04M 1/6066 381/74 |
| 2014/0365214 A1* | 12/2014 | Bayley ................. G10L 15/26 704/235 |
| 2015/0077353 A1 | 3/2015 | Roh |
| 2015/0213694 A1* | 7/2015 | Miura ..................... G08B 3/10 340/692 |
| 2015/0334258 A1 | 11/2015 | O'Neill |
| 2016/0073200 A1* | 3/2016 | Yoo ..................... H04R 5/0335 381/311 |

OTHER PUBLICATIONS

Ericsson, "Bluetooth—A Global Specification for Wireless Connectivity," TSGT2#3(99)368, 3GPP TSG-T2 #3, Yokohama, Japan, Apr. 19-21, 1999, XP050854097, 3 pages.

* cited by examiner (a)

(b)

(a)

(b)

(a)

(b)

PORTABLE ELECTRONIC EQUIPMENT WHICH WIRELESSLY RECEIVES A SOUND SIGNAL FROM A TERMINAL AND TRANSMITS A CONTROL SIGNAL FOR CONTROLLING THE TERMINAL

CROSS-REFERENCE TO RELATED APPLICATIONS

This application claims priority to Korean Patent Application No. 10-2016-0104312 filed on Aug. 17, 2016, in Korea, the entire contents of which are hereby incorporated by reference in their entirety.

BACKGROUND OF THE DISCLOSURE

Field of the Disclosure

Embodiments of the present disclosure relate to a portable electronic equipment which wirelessly receives a sound signal from a terminal and transmits a control signal for controlling the terminal.

Background of the Disclosure

Sound equipment means a sound device for wirelessly receiving a sound signal from a terminal and transmitting information about sound collected via a microphone to the terminal. A related art portable electronic equipment is insertedly connected to an ear jack and transceives a sound signal over wire. However, there is increasing demands for portable electronic equipment communicating with terminals wirelessly in aspects of mobility and ease of use.

There are under development of portable electronic equipment with designs considering mobility which can be categorized into headphone types wearable on a user's head in a band-like shape and ear-wearable types worn on the user's ears.

Recently, there is an increased demand for band-type portable electronic equipment wearable on the user's neck. Thus, a user can always carry a portable electronic equipment wearable on their neck.

SUMMARY OF THE DISCLOSURE

An object of the present disclosure is to provide a portable electronic equipment which is capable of performing not only multimedia playing and calling but also other diverse functions.

Embodiments of the present disclosure provide a portable electronic equipment including a main body configured to be worn on a user's neck; a user input unit on the main body; a short-range wireless chipset loaded in the main body and configured to perform wireless communication with a host media device; and a controller configured to sense, via a sensor, whether or not the user is wearing the main body on their neck, and selectively control the short-range wireless chipset to perform the wireless communication with the host media device via a designated profile supported by the host media device and a function implemented by the host media device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
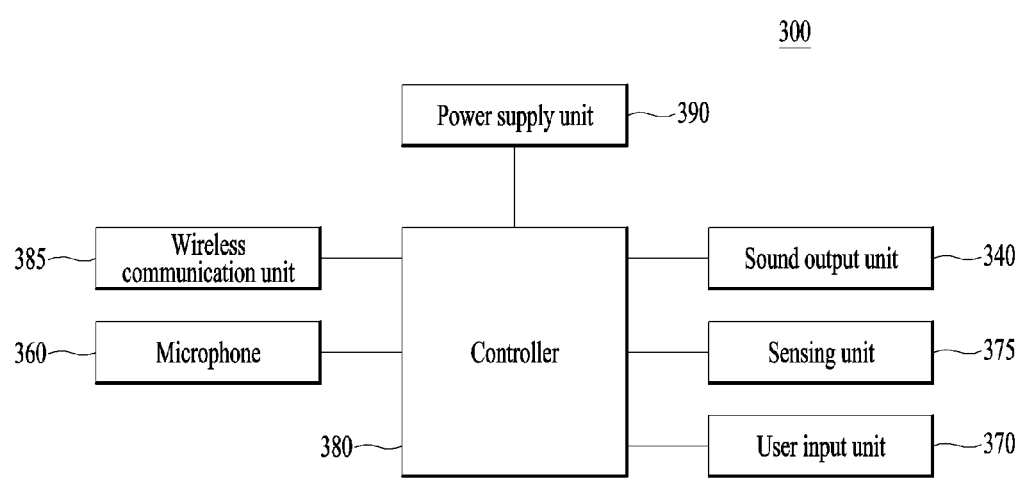
FIG. 1 is a block diagram illustrating a portable electronic equipment according to an embodiment of the present disclosure.
Figure 2:
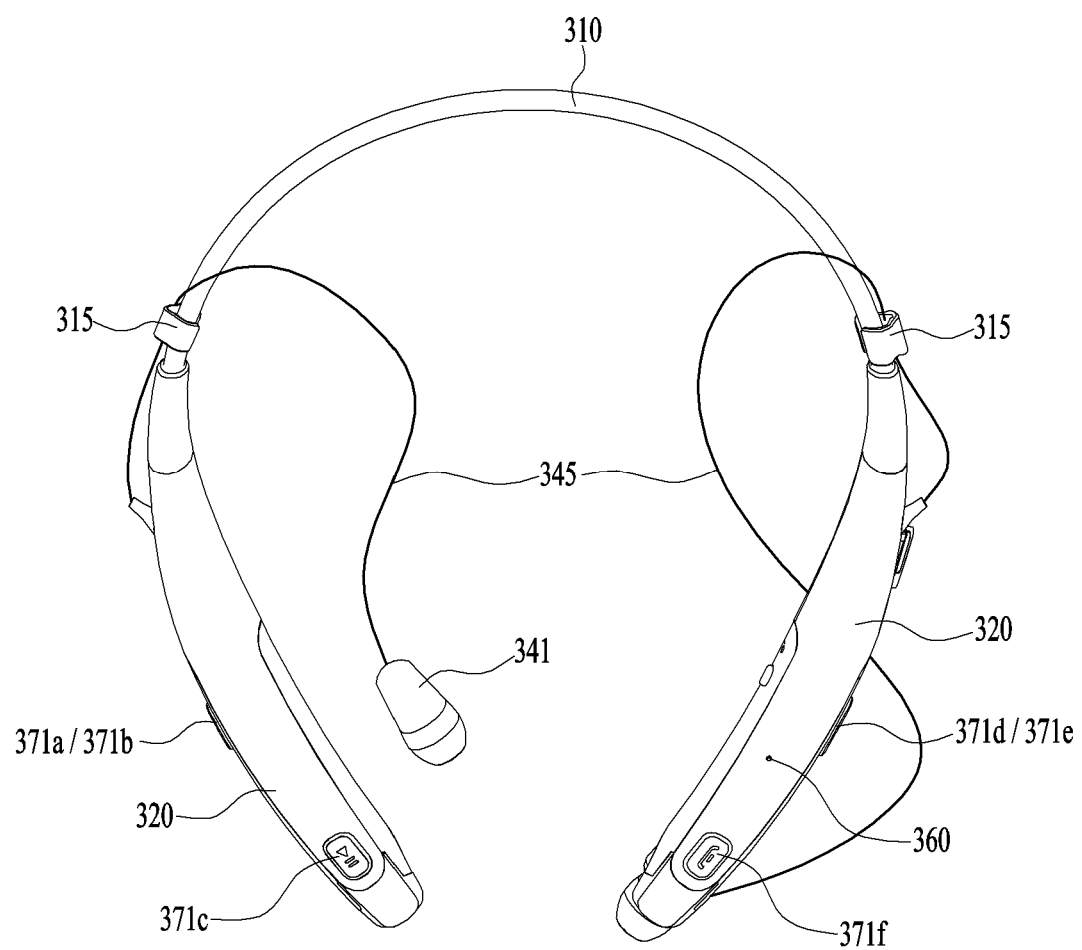
FIG. 2 is a perspective diagram illustrating one example of the portable electronic equipment, viewed in one direction.

FIG. 1 is a block diagram illustrating a portable electronic equipment 300 and FIG. 2 is a perspective diagram illustrating one example of the portable electronic equipment 300, viewed in one direction according to an embodiment of the present invention. As shown, the portable electronic equipment 300 includes a controller 380; a wireless communication unit 385; a sound output unit 340; a sensing unit 375; a microphone 360; a user input unit 370; and a power supply unit 390.

The sound output unit 340 is a device for outputting sound according to a sound signal and examples of the sound output unit 340 include earbuds 341 insertedly worn on the user's ears and deliver sound. The sound output unit 340 also can include a speaker formed in the main body. The microphone 360 processes an external sound signal into electrical data, and the processed sound data is transmitted to an external terminal or server via the wireless communication unit 385. Diverse algorisms for removing the noise generated during the process of receiving external sound signals may also be realized in the microphone 360.

The sensing unit 375 serves as a device for recognizing states and circumstances of the portable electronic equipment. The sensing unit 375 includes a luminance sensor sensing brightness nearby, a touch sensor sensing touch input, a gyro sensor sensing slope and location of the portable electronic equipment 300, and an earbud switch sensing presence of ear buds 341 located in ear bud holders 325.

The user input unit 370 serves as the input module for allowing the user to control the portable electronic equipment 300. The user input unit 370 includes first and second input units 371a and 371b for controlling an order of multimedia playing, a third input unit 371c for playing/stopping multimedia, fourth and fifth input units 371d and 371e for adjusting volume, and a sixth input unit 371f for calling.

A power button and a cable storage button for storing a sound cable 345 in a housing 320 may be provided. The third input unit 371c and the sixth input unit 371f may be provided toward a front surface of the portable electronic equipment 300 worn by the user, in other words, in an upper surface of the housing 320. The first input unit 371a, the second input unit 371b, the fourth input unit 371d and the fifth input unit 371e may be provided in a lateral surface of the housing 320.

The size of the portable electronic device 300 is limited and the user frequently makes inputs without seeing the user input unit 370. If many buttons are provided, it could be difficult for the user to distinguish the functions of buttons from each other. Using a limited number of the buttons, the time period and frequency when the buttons are pressed are combined and inputtable control commands can be expanded.

In addition, the user often continuously wears the portable electronic device 300 and thus it less likely for the user to lose or misplace the portable electronic device 300. However, related art terminals are likely to get lost. Thus, if the user presses two user input units 370 of the portable electronic equipment simultaneously for a preset time period when their terminal is missing or lost, an alarm of a connected terminal sounds and the user can find the lost terminal.

In addition, the voice recording function of the terminal connected by Bluetooth is implemented and the voice collected via the microphone 360 of the portable electronic device 300 can be stored in the terminal. Further, the related art portable electronic equipment 300 can control only the functions of the connected terminal which are simply related to calls or sound media playing. The embodiments of the present disclosure expand the scope of the controllable functions.

In more detail, as shown in FIG. 2, the portable electronic equipment 300 according to an embodiment of the present disclosure includes a main body. The main body includes a band portion 310 and a housing 320 and forms a C-shaped curvature as shown in FIG. 2. The band portion 310 has a C-shaped internal surface configured to contact with the user's neck.

In addition, the band portion 310 has elasticity and gets deformed when a predetermined force is applied to the band portion and restitutes when the applied force is released. The housing 320 is coupled to both ends of the band portion 310 to be located in both ends of the C-shaped curvature formed by the portable electronic equipment 300. A main board, the wireless communication unit 385, a battery and other diverse components are included in the housing 320.

Further, the housing 320 is made of polymer by injection molding. For example, the housing 320 is made of plastic with a certain strength such as polystyrene and may partially include a different material such as metal, glass, leather and the like. Thermoplastic Poly Urethane (TPU) used in the band portion 310 has elasticity and is easily deformed. When the force applied thereto is removed, the band portion made of thermoplastic Poly Urethane restitutes. Also, TPU has a coefficient of friction which is high enough to get in close contact with the user's body.

Shape memory ally may also be inserted in the band portion 310 to ease the restitution of the band portion 310 even if both ends of the band portion 310 are widened. In addition, the shape memory alloy may be formed thicker than a conventional one so as to become deformed only by a predetermined force or more. Accordingly, the unintended separation of the band portion 310 from the user's neck can be prevented.

In addition, the housing 320 may be made of Polystyrene (PS) having a predetermined strength to protect the internal components and polyurethane may be coated on a surface of the housing 320 to facilitate the close contact of the housing 320 with the user's body part. When such polyurethane coating is performed on the surface of the housing 320, the exterior design with unity can be provided in the portable electronic equipment 300 and both the band portion 310 and the housing 320 can become in close contact with the user's skin not to be shaken along with the user's movement. Accordingly, the portable electronic equipment 300 has an advantage of good wearing sensation.

Further, the portable electronic equipment 300 which is wearable on the human body part is easily exposed to moisture such as sweat. If provided with a waterproof function, the portable electronic equipment 300 has an improved durability. A rib or a waterproof material may be disposed a gap between upper and lower cases to cover the gap so that water penetration can be prevented. Even if no auxiliary waterproof material is disposed in the gap, the polyurethane collating can seal the gap between the upper and lower cases.

The C-shaped portable electronic equipment 300 can be worn on the user's neck and carried with the user. The sensing unit (sensor) 375 may be provided in the band portion 310 to sense whether the user wears the portable electronic equipment 300. For example, a displacement sensor for sensing a curvature variation can be used.

When the user intends to wear the portable electronic equipment 300, the displacement sensor can sense the widening of both ends of the portable electronic equipment 300.

In this instance, the curvature of the band portion 310 is gently changed and it is sensed that the user tries to use the portable electronic equipment 300. Then, the portable electronic equipment 300 can switch on the power or synchronize the portable electronic equipment 300 with an external terminal.

Further, the displacement sensor can sense and consider curvature after sensing the drastic change of the curvature in the band portion 310, so as to determine whether both ends are widened while the user is carrying the portable electronic equipment 300 or when the user intends to wear the portable electronic equipment 300. When the displacement sensor senses that the curvature is fixed as a second value after the curvature has drastically changed as a first value, the controller 380 can determine that the user wears the portable electronic equipment 300 on their neck.

Not only the displacement sensor but also a temperature sensor, an optical sensor or a heat rate sensor may be provided in the surface configured to contact with the user's neck when the user wears the portable electronic equipment 300. When the temperature is in a range of human body temperatures, a brightness becomes dark or a heat rate is sensed, the controller 380 can determine that the user wears the portable electronic equipment 300. Hence, the portable electronic equipment 300 controls the power to be switched on or the wireless communication unit 385 to become implemented so as to be synchronized with an external terminal.

As one alternative example, a switch which is physically pressable may be provided. When the user wears the portable electronic equipment 300, the switch is pressed and an ON signal is generated. When the switch-ON state is maintained for a preset time period or more, the power of the portable electronic equipment 300 is switched on or synchronized with an external terminal. Further, a plurality of sensors and switches may be provided and a plurality of values precise determination may be made on presence of the portable electronic equipment 300 worn on the user's neck based on the combined values of the sensors and switches.

In addition, the earbud 341 as the sound output unit 340 can be insertedly worn on the user's ear and then arranged spaced apart from the housing 320. Further, the earbud 341 is connected with the housing 320 via a sound cable 345. One end is connected to the main board loaded in the housing 320 and the other end of the sound cable 345 is connected to the earbud 341. The controller 380 transmits the sound signal received from the wireless communication unit to the earbud 341 via the sound cable 345.

When the user inserts in the earbud 341, the distance between the earbud 341 and the housing 320 varies according to the body sizes of the users. If the sound cable 345 is too long, the user will feel encumbered with the long sound cable 345. If the sound cable 345 is too short, it is difficult to insert the earbud 341 into the ear, which is distant from the shoulder.

Moreover, when the user turns their head right and left or moves their head up and down, the too short sound cable 345 gives the user an uncomfortable feeling. Accordingly, the sound cable 345 is preferably sufficiently long and a wire ring 315 may be further provided in a certain region of the sound cable 345 to fix the sound cable 345 to the band portion 310.

The wire ring 315 is an annular material covering the band portion 310 and the sound cable 345. As the wire ring 315 moves along the band portion 310, the distance between the earbud 341 and the housing 320 is adjusted. In other words, when the wire ring 315 is moved far from the housing 320, the extendible length of the sound cable 345 becomes short. When the wire ring 315 is moved close to the housing 320, the extendible length of the sound cable 345 becomes long.

The earbud 341 may be detachable from the housing 320. When not listening to music or talking on the phone, the user can connect the earbud 341 to an earbud holder of the housing 320 and carry the earbud 341 with him or her.

Further, the housing 320 includes a power button for turning on and off the power of the portable electronic equipment 300, a button for playing or calling, a direction key for controlling sound (the direction key may be used in playing the previous or next one of the currently playing track). The buttons may be provided as dome keys, which are physically pressable or touch keys, which are sensed by a capacity variation.

Locations of touch keys are not limited and the overall surface of the housing 320 may be used. When the touch key is realized in the surface of the housing 320, an LED may be provided in the portion where the touch key is realized and the location and function of the touch key may be displayed. In addition, the earbud 341 is insertedly worn on the user's ear and outputs sound. The earbud 341 is connected to the main board via the sound cable 345 and the main board controls the earbud 341 to control sound to be output according to a sound signal.

In addition, the portable electronic equipment 300 according to an embodiment of the present disclosure supports a Human Interface Device (HID) profile. In particular, the Profile means a type of language specification and the devices capable of supporting the same profile transceive information as the form of the corresponding profile. Examples of the profile for Bluetooth includes HSP (Head Set Profile), HFP (Hands Free Profile), A2DP (Advanced Audio Distribution Profile), AVRCP (Audio/Video Remote Control Profile), HID (Human Interface Device) and the like.

HSP and HFP are profiles for headsets and hands-free and are associated with a call function of a mobile phone. HSP transmits call voice and HFP provides remote controllable functions such as re-dial, voice dial, call receiving and ending and is applied to headsets for calls or hands-free system for vehicles. HSP and HFP are profiles for call and have 64 bit/s in sound quality and provided in the mono format so that they are not proper as profiles for music playing.

A2DP is a Bluetooth profile and supports stereo audio format. Headsets and host devices for music appreciation which uses Bluetooth basically support A2DP. AVRCP supports functions for controlling music playing such as music playing, music stopping, playing the previous and next one in the playlist, which HFP supports manipulation of call functions.

HID is a Bluetooth communication profile which communicates with peripheral devices configured to receive user inputs or outputs and is applied to a manipulation device such as a mouse, a keyboard and a controller. HID is realized in a similar format with a USB so that the HID profile can be applied to a wireless keyboard, a wireless mouse, a wireless game controller.

A related art Bluetooth device and a related art mobile terminal support only HSP, HFP, A2DP and AVRCP, because their functions are concentrated on music playing and calling. Recently, smart phones support a broader range of profiles.

When releasing high performance portable electronic equipment such as an earset, manufacturers use a programmable high performance Bluetooth chipset supporting the HDI profile. The portable electronic equipment performing HID profile Bluetooth communication can support more diverse functions as well as simple calling and music appreciation functions.

Figure 3:
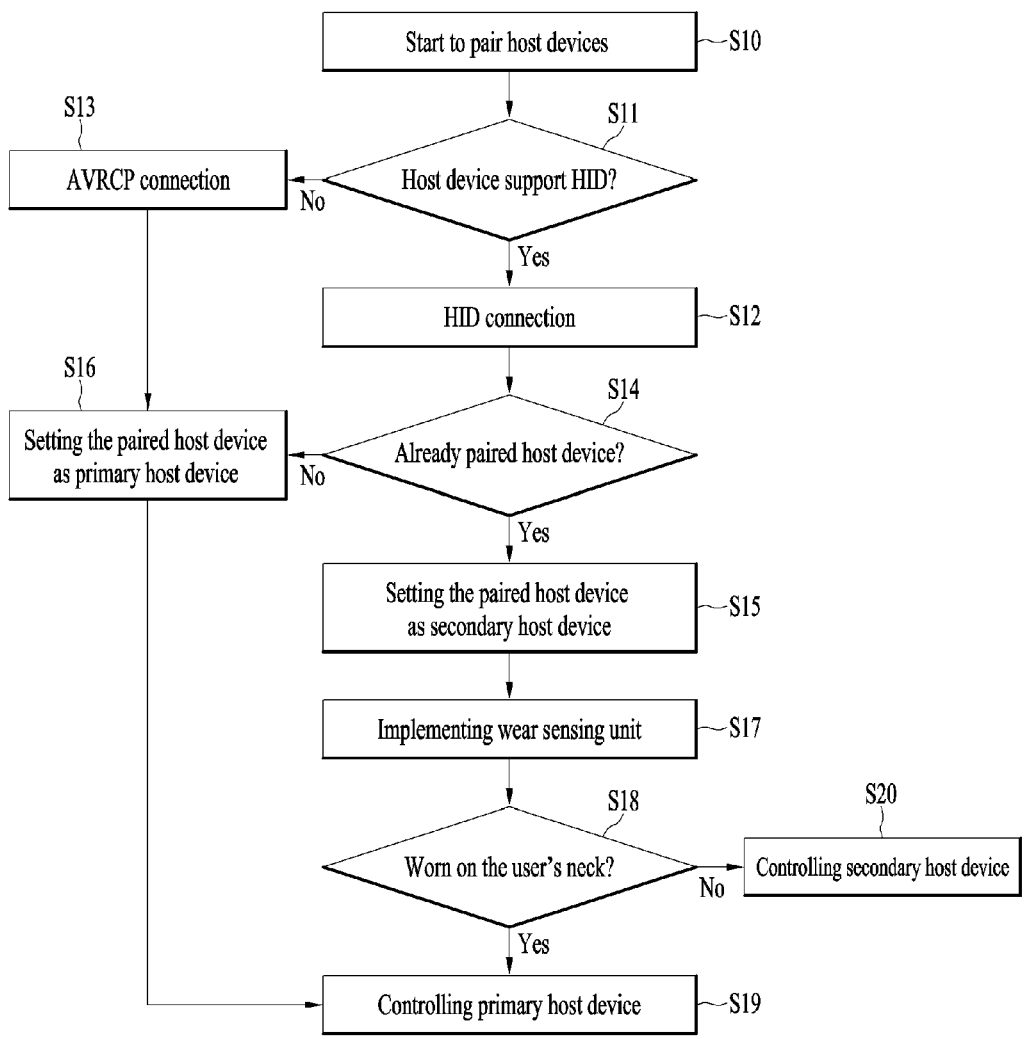
FIG. 3 is a flow chart illustrating the control of one example of the portable electronic equipment.
Figure 4:
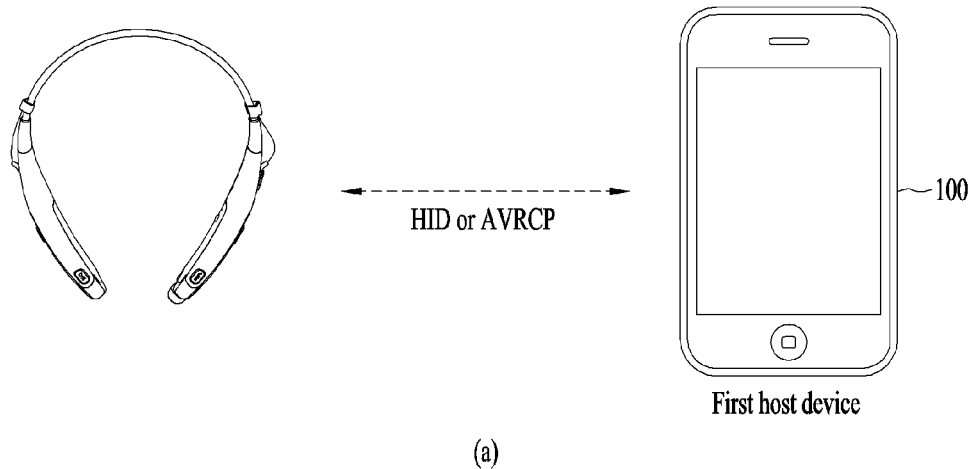
FIG. 4 is a diagram illustrating a process of pairing host devices and one example of the portable electronic equipment together.
Figure 4:
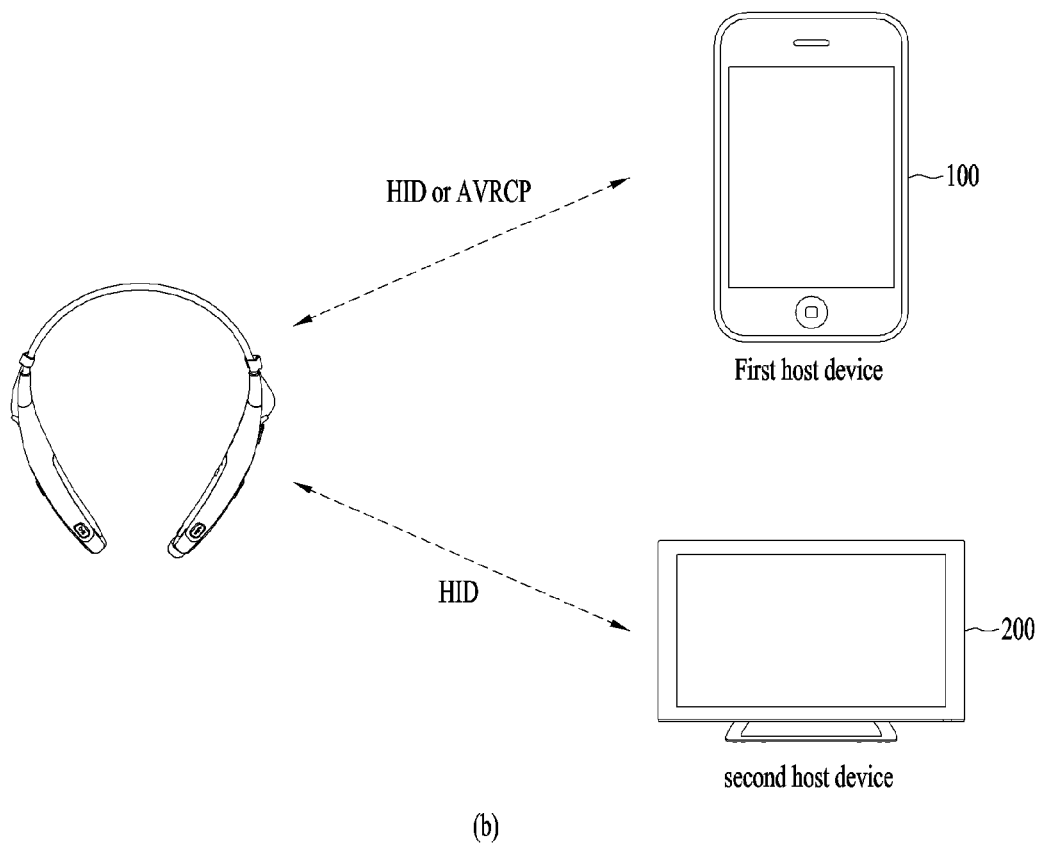

Next, FIG. 3 is a flow chart illustrating a method of controlling the portable electronic equipment 300, and FIG. 4 is a diagram illustrating a process of pairing host devices 100 and 200 and the portable electronic equipment 300.

Referring to FIG. 3, the host devices 100 and 200 start to be paired via the wireless communication unit 385 (S10). At this time, the Bluetooth profiles supportable by the host devices 100 and 200 have to be checked and the host devices 100 and 200 are connected to the supportable Bluetooth profiles. HSP, HFP, A2DP and AVRCP profiles are supported by most related art Bluetooth wirelessly communicable devices. The HID profile is supported only by recently released smart phones and it has to be checked whether the paired host devices 100 and 200 support the HID profile (S11).

When the host device supports HID (Yes in S11), the host devices are connected via an HID profile (S12). The other profiles (HSP, HFP and A2DP) are used in making calls or listening to music and corresponding profiles are used, regardless of the HID support. In case of not supporting the HID profile (No in S11) and being connected to ARVCP (S13), the paired host device performs only functions of making calls and listening to music and is set as the primary host device (or the first host device) 100 (S16). If there is no paired host device even when connected to HID (No in S14), the primary host device 100 is set as the paired device (see FIG. 4 (a)).

When there is the already paired host device (Yes in S14), the already paired host device is set as the primary host device 100 and the currently paired host device is set as the second host device (the second host device) 200 (S15) (see FIG. 4 (b)). In this instance, the primary host device 100 means the host device for music appreciation and call and the secondary host device 200 means the host device for presentation when multi-paired with other devices.

Figure 5:
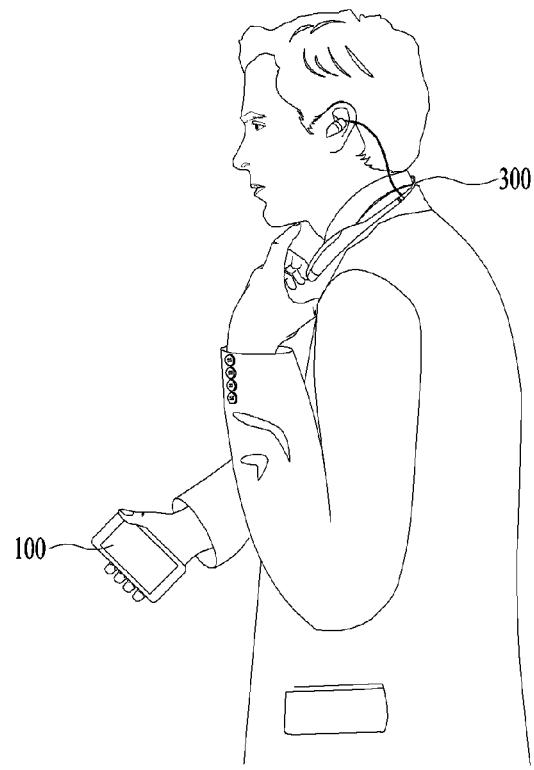
FIG. 5 is a diagram illustrating a use embodiment of one example of the portable electronic equipment.
Figure 5:
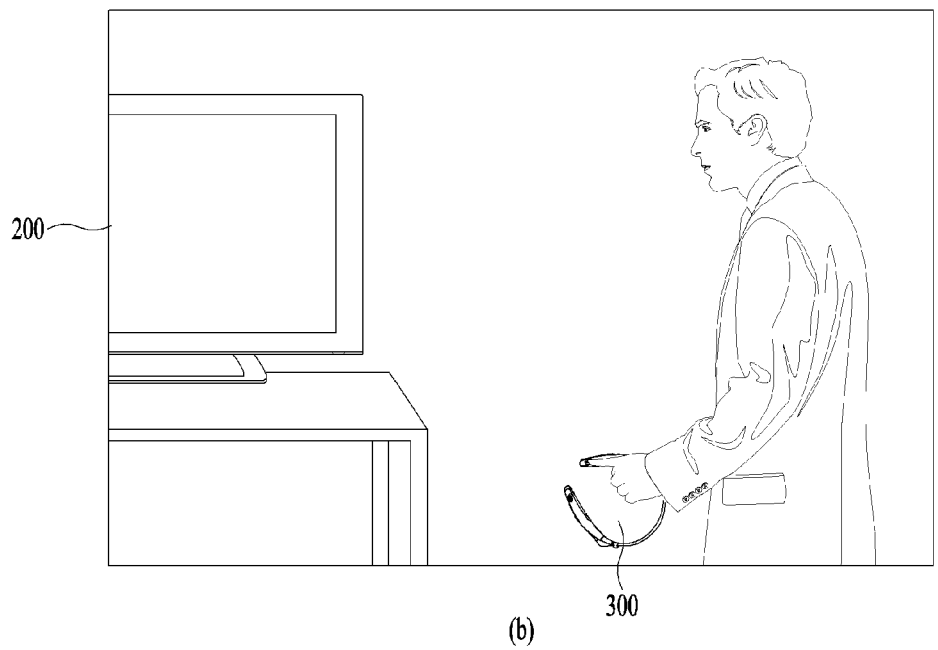

When the secondary host device 200 is multi-paired in a state of maintaining the existing host devices 100 and 200 paired with each other (S15), a wear sensing unit is implemented (S17) and senses whether the user is putting on the portable electronic equipment 300 on their neck (S18). For example, FIG. 5 is a diagram illustrating a use embodiment of the portable electronic equipment. In particular, FIG. 5 (a) illustrates the user wearing the portable electronic equipment 300 on their neck, The controller 380 can also determine if the user has at least one earbud 341 inserted into their ear, and FIG. 5 (b) illustrates the user not wear the portable electronic equipment on their neck.

As shown in FIG. 5 (a), the controller 380 determines that the user intends to use a function of music appreciation or call when wearing the portable electronic equipment 300 on their neck and controls the already paired primary host device 100 (S19). As shown in FIG. 5 (b), the controller 380 determines that the user intends to use the portable electronic equipment 300 for presentation because the user is not wearing the portable electronic equipment 300 on their neck and controls the secondary host device 100 (S20).

To determine the wearing of the portable electronic equipment on the user's neck, a wear sensing unit may be provided in the portable electronic equipment 300. For example, an IR sensor or the microphone 360 may be used as the wear sensing unit. In addition, the IR sensor may be provided in the portion which will contact with the user's body part when the user wears the portable electronic equipment 300. When the user wears the portable electronic equipment 300, the IR sensor is invisible outside and capable of sensing the presence of the portable electronic equipment 300 worn on the user's neck.

The controller 380 can determine the user wears the portable electronic equipment 300 when a switch is pressed by the user's body part or the microphone 360 senses friction sound between the main body and the user's body part. Other diverse methods are also available. As one example of the other diverse methods, the controller 380 can sense whether the user wears the portable electronic equipment on their neck more precisely by combining the values measured by a plurality of wear sensing units.

As shown in FIG. 5 (a), the portable electronic equipment 300 may use a function of multimedia playing or call in the same method as the related portable electronic equipment.

When using the portable electronic equipment in the presentation as a remote control as shown in FIG. 5(b), the following functions are preferably matched with the buttons, respectively. (Table 1) is one example of the matching between the buttons of the portable electronic equipment 300 and the functions of the presentation remote control.

TABLE 1

| | Short Input | Long Input |
| --- | --- | --- |
| FF | Previous Page | Screen: White |
| REW | Next Page | Screen: Black |
| PLAY | Start/finish from the first page | Start/finish from the current page |

When input signals are sensed from a first button (FF) 371a and a second button (REW) 371b for passing the previous and next one in the playlist, a screen of the presentation passes to the next or previous page. When input signals are sensed from a third button (PLAY) 371c, a new presentation starts or the ongoing presentation finishes.

Divers signal inputs may be performed such as short input signals, long input signals or dual input signals and simultaneous pressing of more than two buttons. For example, when a long input signal is sensed from the first button 371a, the screen is changed into a white screen. When a long input signal is sensed from the second button 371b, the screen is changed into a black screen. The input signals sensed from the third button 371c are divided into short input signals and long input signals so as to distinguish start/finish from the first page from start/finish from the current page.

As shown in FIG. 2, the portable electronic equipment 300 according to an embodiment of the present disclosure may further include fourth, fifth and sixth buttons provided in the opposite housing 320 rather than the first, second and third buttons provided in one housing 320. However, it is difficult for the user to press the buttons provided in the other housing 320 during the presentation after changing the housing 320 held by the user into the other opposite housing 320. It is preferred that functions needed for the presentation are realized only by using the buttons provided in one housing 320. Accordingly, the fourth, fifth and sixth buttons 371d, 371e and 371f are not activated or they are provided with the same functions as the first, second and third buttons 371a, 371b and 371c.

Figure 6:
FIG. 6 is a diagram illustrating another use embodiment of one example of the portable electronic equipment.
Figure 6:
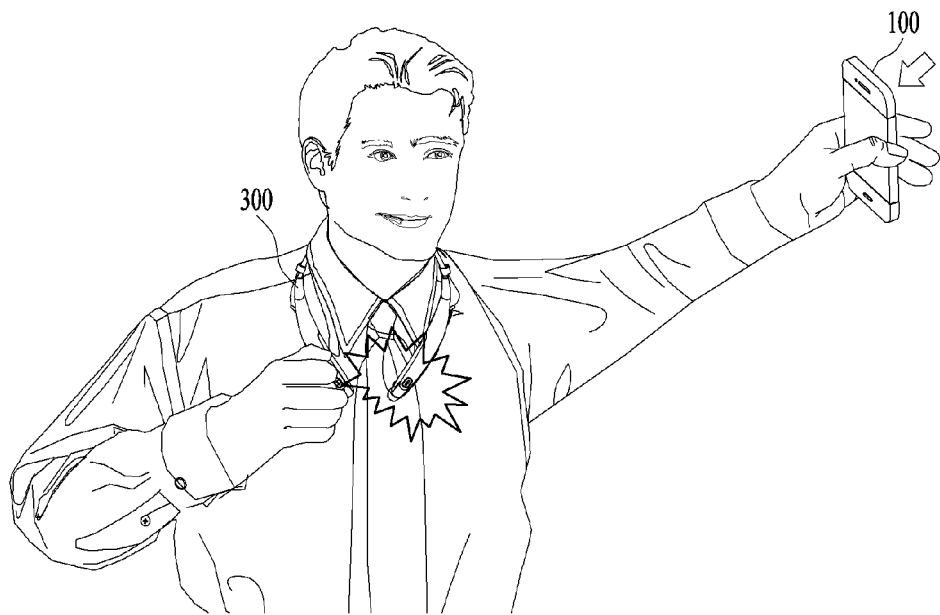

Next, FIG. 6 is a diagram illustrating another use embodiment of the portable electronic equipment 300. In particular, the portable electronic equipment 300 according to an embodiment of the present disclosure is used when worn on the user's neck and can control the host devices 100 and 200 to perform a photographing operation.

As shown in FIG. 6, photographs of the user, for example, can be taken by pressing the sound button (the fourth button 371d and fifth button 371e) of the portable electronic equipment 300. At this time, the U-shaped end of the portable electronic equipment 300 worn on the user's neck is located close to the user's face and an optical output unit is provided in the portable electronic equipment 300 as auxiliary AF light.

When the user presses the fourth and fifth buttons 371d and 371e, the optical output unit becomes luminescent and provides information about the location of the user's face to the camera. Then, the camera focuses on a precise location based on the information and takes a photograph. The user's face is also illuminated when the mobile terminal or host device 100 is controlled to capture an image of the user's face.

It is also possible to take a photograph without the user's direct pressing of the button of the mobile terminal so as to take a photograph of a remote location. Accordingly, a problem of camera movement which is generated by the user pressing the buttons of the mobile terminal may be prevented. The controller 380 can also determine the user wants to use the headset 300 as a remote control device for controlling the mobile terminal 100 because the user is wearing the headset 300 on their neck with their arm extended to capture a selfie, for example. The controller 30 can also determine the user wants to use the headset 300 as a remote control device for controlling the mobile terminal 100 because the user is wearing the headset 300 on their neck, but is not using the earbuds 341 (and thus is not using the headset 300 as a listening device for listening to music or performing a calling operation).

The optical output unit may be provided in an end of the main body to be located adjacent to the user's face. When a hole for the optical output unit is formed in the housing 320, the exterior design with unity might be deteriorated and the optical output unit may be provided in the third or sixth button 371c or 371f provided in the front surface of the portable electronic equipment 300. An LED may be provided in the button to display the functions. In this instance, AF light may be provided without providing additional members.

As described above, the portable electronic equipment 300 according to an embodiment of the present disclosure may be used as a remote control for presentation and self-photo as well as the a call/multimedia playing function. Accordingly, the portable electronic equipment 300 may have an expanded range of functions.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A portable electronic equipment comprising:
   a main body configured to be worn on a user's neck;
   a user input unit on the main body;
   a short-range wireless chipset loaded in the main body and configured to perform wireless communication with a first host media device and a second host media device; and
   a controller configured to:
   sense, via a sensor, whether or not the user is wearing the main body on their neck,
   selectively control the short-range wireless chipset to perform the wireless communication with the first host media device and the second host media device via a designated profile supported by the first host media device and the second host media device and a function implemented by the first host media device and the second host media device,
   in response to the sensor sensing the user is wearing the main body on their neck, control the short-range wireless chipset to function as a multimedia or calling device and wirelessly communicate with the first host media device in a calling or multimedia playing mode and to output calling audio data or multimedia audio data received from the first host media device, and
   in response to the sensor sensing the user is not wearing the main body on their neck, control the short-range wireless chipset to function as a remote control for controlling the second host media device,
   wherein the first host media device is a mobile terminal for performing call/multimedia playing and the second host media device is a presentation terminal.

2. The portable electronic equipment of claim 1, further comprising:
   a speaker formed in the main body; and
   earbuds extendably attached to the main body and configured to be extended from the main body and inserted into the user's ears,
   wherein the controller is further configured to output the audio data via the earbuds when the earbuds are extended and inserted into the user's ears and to output the audio data via the speaker when the earbuds are not extended and inserted into the user's ears.

3. The portable electronic equipment of claim 1, wherein the user input unit includes:
   a first input unit for skipping to a next song; and
   a second input unit for skipping to a previous song,
   wherein when the short-range wireless chipset controls the first media device, the controller is further configured to:
   control the first host media device to skip to the next song in response to the first input unit being manipulated, and
   control the first host media device to skip to the previous song in response to the second input unit being manipulated.

4. The portable electronic equipment of claim 3, wherein when the short-range wireless chipset controls the second media device, the controller is further configured to:
   control the second host media device to skip to a next page of content displayed on the second host media device in response to the first input unit being manipulated, and control the second host media device to skip to a previous page of the content displayed on the second host media device in response to the second input unit being manipulated.

5. The portable electronic equipment of claim 3, further comprising:
a third input unit for increasing an output volume of the portable electronic equipment; and
a fourth input unit for decreasing an output volume of the portable electronic equipment,
wherein when the short-range wireless chipset is controlled to function as the multimedia or calling device, the controller is further configured to:
increase the output volume of the portable electronic equipment in response to the third input unit being manipulated, and
decrease the output volume of the portable electronic equipment in response to the fourth input unit being manipulated, and
wherein when the short-range wireless chipset is controlled to function as the remote control, the controller is further configured to:
control the host media device to capture an image in response to at least one of the third input unit and the fourth input unit being manipulated.

6. The portable electronic equipment of claim 5, further comprising:
an illumination lamp on the main body and configured to illuminate a face of the user when the host media device is controlled to the capture the image.

7. The portable electronic equipment of claim 6, wherein the main body has a C-shaped appearance wearable on the user's neck, and
wherein the illumination lamp is arranged adjacent to an end of the C-shape.

8. The portable electronic equipment of claim 6, wherein the illumination lamp is provided in the user input unit provided in a front surface of the main body.

9. The portable electronic equipment of claim 1, wherein the profile comprises one or more of an HFP (Hands Free Profile), AVRCP (Audio/Video Remote Control Profile), HID (Human Interface Device) and A2DP (Advanced Audio Distribution Profile).

10. The portable electronic equipment of claim 9, wherein the controller is further configured to:
use an HFP profile-based wireless communication when the host media device performs a call function, and
use an A2DF profile-based wireless communication when the host media device plays multimedia.

11. The portable electronic equipment of claim 1, wherein the controller is further configured to:
pair the portable electronic equipment to the host media device,
pair the portable electronic equipment to a new connected host media device, and
in response to the sensor sensing the user is not wearing the main body on their neck, control the short-range wireless chipset to function as a remote control for controlling the new host media device.

12. The portable electronic equipment of claim 11, wherein the controller is further configured to:
in response to the sensor sensing the user is wearing the main body on their neck, control the short-range wireless chipset to control the host media device.

13. The portable electronic equipment of claim 1, wherein the sensor comprises a microphone on the portable electronic equipment, and
wherein the controller is further configured to sense the user is wearing the main body, when the microphone senses a friction sound between the main body and the user.

14. The portable electronic equipment of claim 1, wherein the sensor comprises an IR sensor, and
wherein the controller is further configured to sense the user is wearing the main body, when the IR sensor senses a proximity of the user.

15. The portable electronic equipment of claim 1, wherein the host media device is one of a mobile terminal for performing call/multimedia playing and a presentation terminal.

16. A method of controlling a portable electronic equipment including a main body configured to be worn on a user's neck, a user input unit on the main body, and a short-range wireless chipset loaded in the main body and configured to perform wireless communication with a first host media device and a second host media device, the method comprising:
sensing, via a sensor, whether or not the user is wearing the main body on their neck;
selectively controlling, via a controller, the short-range wireless chipset to perform the wireless communication with the first host media device and the second host media device via a designated profile supported by the first host media device and the second host media device and a function implemented by the first host media device and the second host media device;
in response to the sensor sensing the user is wearing the main body on their neck, controlling the short-range wireless chipset to function as a multimedia or calling device and wirelessly communicating with the first host media device in a calling or multimedia playing mode and outputting calling audio data or multimedia audio data received from the first host media device; and
in response to the sensor sensing the user is not wearing the main body on their neck, controlling the short-range wireless chipset to function as a remote control for controlling the second host media device,
wherein the first host media device is a mobile terminal for performing call/multimedia playing and the second host media device is a presentation terminal.

17. The method of claim 16, further comprising:
outputting the audio data via earbuds when the earbuds are extended and inserted into the user's ears; and
outputting the audio date via a speaker when the earbuds are not extended and inserted into the user's ears.

* * * * *